United States Patent [19]

Kinoshita et al.

[11] Patent Number: 5,201,058
[45] Date of Patent: Apr. 6, 1993

[54] CONTROL SYSTEM FOR TRANSFERRING VECTOR DATA WITHOUT WAITING FOR TRANSFER END OF THE PREVIOUS VECTOR DATA

[75] Inventors: Kouji Kinoshita, Tokyo; Yukiyoshi Ikeya, Yamanashi, all of Japan

[73] Assignee: NEC Corporation, Tokyo, Japan

[21] Appl. No.: 418,215

[22] Filed: Oct. 6, 1989

[30] Foreign Application Priority Data

Oct. 8, 1988 [JP] Japan .................. 63-252902

[51] Int. Cl.$^5$ .............................. G06F 13/00
[52] U.S. Cl. .................. 395/800; 364/232.21; 364/260.2; 364/DIG. 1
[58] Field of Search ............. 395/250, 325, 425; 364/200 MS File, 900 MS File

[56] References Cited

U.S. PATENT DOCUMENTS

| 4,128,880 | 12/1978 | Cray, Jr. et al. | 364/200 |
|---|---|---|---|
| 4,166,289 | 8/1979 | Murtha et al. | 364/200 |
| 4,438,493 | 3/1984 | Cushing et al. | 395/425 |
| 4,712,175 | 12/1987 | Tonii et al. | 364/200 |
| 4,717,912 | 1/1988 | Harvey et al. | 340/825.83 |
| 4,760,518 | 7/1988 | Potash et al. | 364/200 |
| 4,760,545 | 7/1988 | Inagami et al. | 364/200 |
| 4,825,361 | 4/1989 | Omoda et al. | 364/200 |
| 4,910,667 | 3/1990 | Tanaka et al. | 364/200 |

FOREIGN PATENT DOCUMENTS 0240032 10/1987 European Pat. Off. .

OTHER PUBLICATIONS

Patent Abstracts of Japan, vol. 5, No. 157 (P-83)[829], Oct. 8, 1981 (JP-A-56 88 559).
Patent Abstracts of Japan, vol. 5, No. 157 (P-83)[829], Oct. 8, 1991 (JP-A-56 88 562).
Patent Abstracts of Japan, vol. 6, No. 133 (P-129)[1011], Jul. 20, 1982 (JP-A-57 57 372).

Primary Examiner—Thomas C. Lee
Assistant Examiner—Ayni Mohamed
Attorney, Agent, or Firm—Foley & Lardner

[57] ABSTRACT

A data transfer controller controls transfer of vector data from a first device to a second device, and the vector data consists of a plurality of elements. The data transfer controller includes a buffer memory, located between the first and second devices, for sequentially storing the vector data supplied from the first device, n read address counters for controlling to sequentially transfer the vector data from the first device to the buffer memory and each for controlling to read out one vector data from the buffer memory to the second device, and n data transfer paths respectively corresponding to the n read address counters and arranged between the buffer memory and the second device.

3 Claims, 4 Drawing Sheets

| 113 | 302 | 303 | 305 | 119 | 120 | 116 | 118 | 309 | 310 |
|---|---|---|---|---|---|---|---|---|---|
| 1 | d.c. | 0 | 0 | d.c. | d.c. | d.c. | d.c. | 1 | 0 |
| 1 | d.c. | 0 | 1 | d.c. | 1 | d.c. | d.c. | 1 | 0 |
| 1 | d.c. | 0 | 1 | d.c. | 0 | d.c. | 1 | 1 | 0 |
| 0 | 1 | 0 | 1 | d.c. | d.c. | d.c. | d.c. | 1 | 0 |
| 1 | d.c. | 1 | 0 | 1 | d.c. | d.c. | d.c. | 0 | 1 |
| 1 | d.c. | 1 | 0 | 0 | d.c. | 1 | d.c. | 0 | 1 |
| 0 | 1 | 1 | 0 | d.c. | d.c. | d.c. | d.c. | 0 | 1 |
| OTHER COMBINATIONS | | | | | | | | 0 | 0 |

Note) d.c. stands for "don't care"

FIG.4

CONTROL SYSTEM FOR TRANSFERRING VECTOR DATA WITHOUT WAITING FOR TRANSFER END OF THE PREVIOUS VECTOR DATA

BACKGROUND OF THE INVENTION

The present invention relates to a data transfer controller in a data processing system and, more particularly, to a data transfer controller for transferring vector data from a main memory to a vector data processor.

Strong demand has arisen for high-speed supply of a large amount of data to allow high-speed vector calculations in a high-speed vector computer used in scientific calculations. In order to allow high-speed supply of a large amount data, for example, U.S. Pat. No. 4,128,880 discloses a vector processor. In this vector processor, the number of independently operable banks is increased to read out elements of vector data every clock cycle, and the readout elements are supplied to vector registers. When the first element is supplied to the vector register, a vector calculation is started.

In this conventional vector processor, since only one element of the vector data is supplied to the vector register every clock cycle, when a calculation is performed between two vector data, the vector calculation cannot be started until transfer of the second vector data is started. In order to solve this problem, there is a conventional method of simultaneously reading out elements of two vector data from a memory. In this case, bank busy management of the two different vector data must be performed to complicate the control.

SUMMARY OF THE INVENTION

It is an object of the present invention to provide a data transfer controller capable of transferring vector data to vector registers at high speed in accordance with simple control.

It is another object of the present invention to provide a data transfer controller capable of causing a vector processor to start vector calculations at an early timing since transfer of the second vector data can be started without waiting for an end of transfer of the first vector data.

In order to achieve the above objects of the present invention, there is provided a data transfer controller for controlling transfer of vector data from a first device to a second device, the vector data consisting of a plurality of elements, comprising storing means, located between the first and second devices, for sequentially storing the vector data supplied from the first device, n read control means for controlling to sequentially transfer the vector data from the first device to the storing means and each for controlling to read out one vector data from the storing means to the second device, and n data transfer paths respectively corresponding to the n read control means and arranged between the storing means and the second device.

BRIEF DESCRIPTION OF THE DRAWINGS

FIG. 4 is a truth table showing the logic of a read start designation circuit 209 shown in FIG. 3.

DESCRIPTION OF THE PREFERRED EMBODIMENT

The present invention will be described in detail with reference to the accompanying drawings.

Figures 1, 2:
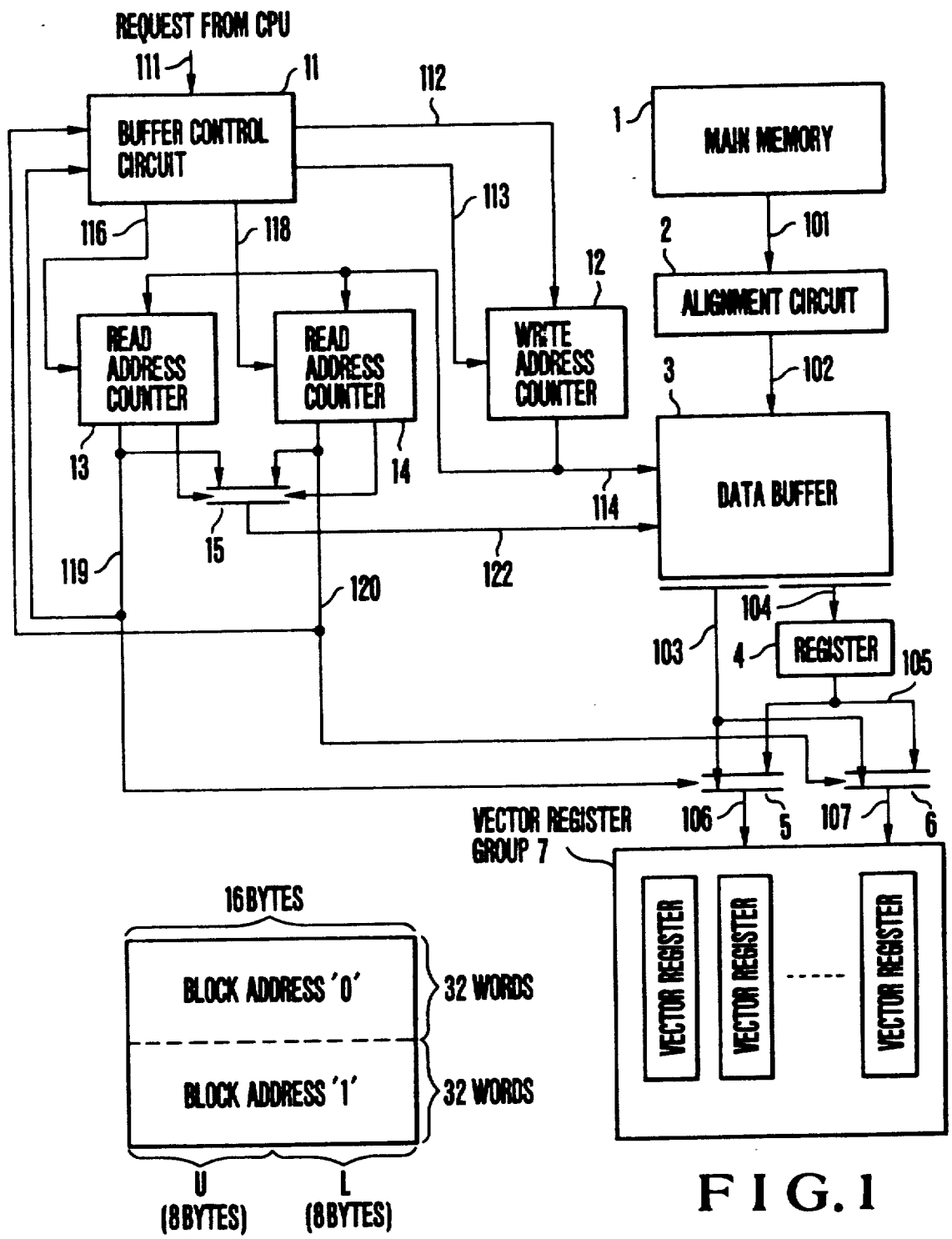
FIG. 1 is a block diagram showing an arrangement of a data transfer controller according to an embodiment of the present invention.
FIG. 2 is a memory map showing block assignment of a data buffer 3 shown in FIG. 1.

FIG. 1 shows a data transfer controller according to an embodiment of the present invention. Referring to FIG. 1, a main memory 1 can read out 16-byte data every clock cycle, and the readout data is supplied to a data buffer 3 through an alignment circuit 2. In the data buffer 3, as shown in FIG. 2, two data each consisting of 16 bytes × 32 words are set in two blocks, respectively. One vector data is set in each block. Two, 8-byte elements correspond to one word of the data buffer 3.

A write address for the data buffer 3 is supplied from a write address counter 12 through a line 114. One of values obtained by omitting LSBs (Least Significant Bits) from values of read address counters 13 and 14 is selected by a switching circuit 15, and the selected value is supplied as a read address through a line 122.

Of the data read out from the data buffer 3, the upper 8-byte data is supplied to switching circuits 5 and 6 through a line 103. The lower 8-byte data is delayed by a register 4 by one clock cycle, and the delayed data is supplied to the switching circuits 5 and 6 through a line 105. The switching circuits 5 and 6 select elements from the upper and lower 8-byte data corresponding to the same word of the data buffer 3, and the selected elements are supplied to a vector register group 7. This selection is performed by the LSBs of the outputs from the read address counters 13 and 14. The lower 8-byte elements supplied through the line 105 are selected when the LSBs are both set at logic "1".

The vector register group 7 comprises at least two vector registers each for storing vector data having at least one element. The number of vector registers is not important in the present invention, and a description concerning the number of vector registers will be omitted.

The write address counter 12 is a 6-bit counter for storing a write address for the data buffer 3. An initial address 112 is set in response to a write start designation signal 113 supplied from a buffer control circuit 11 and is incremented one by one every clock cycle.

The read address counters 13 and 14 are 7-bit counters for storing addresses for reading out vector data from the data buffer 3 to supply the readout vector data to the vector register group 7 through lines 106 and 107. The MSB (Most Significant Bit) of the address counter 12 is set in the MSBs of the counters 13 and 14 in accordance with read start designation signals 116 and 118 supplied from the buffer control circuit 11. The remaining bits of the counters 13 and 14 are cleared to zero. One of the 6-bit data excluding the LSBs from the read address counters 13 and 14 is selected by the switching circuit 15, and the selected data is supplied to the data buffer 3.

The switching circuit 15 is selected by the LSB of the read address counter 13. When the content of the read address counter 13 represents an even number, the read address counter 13 is selected by the switching circuit 15. However, when the content of the read address counter 13 represents an odd number, the read address counter 14 is selected by the switching circuit 15. The LSBs of the address counters 13 and 14 are supplied as selection signals to the switching circuits 5 and 6, respectively.

Figure 3:
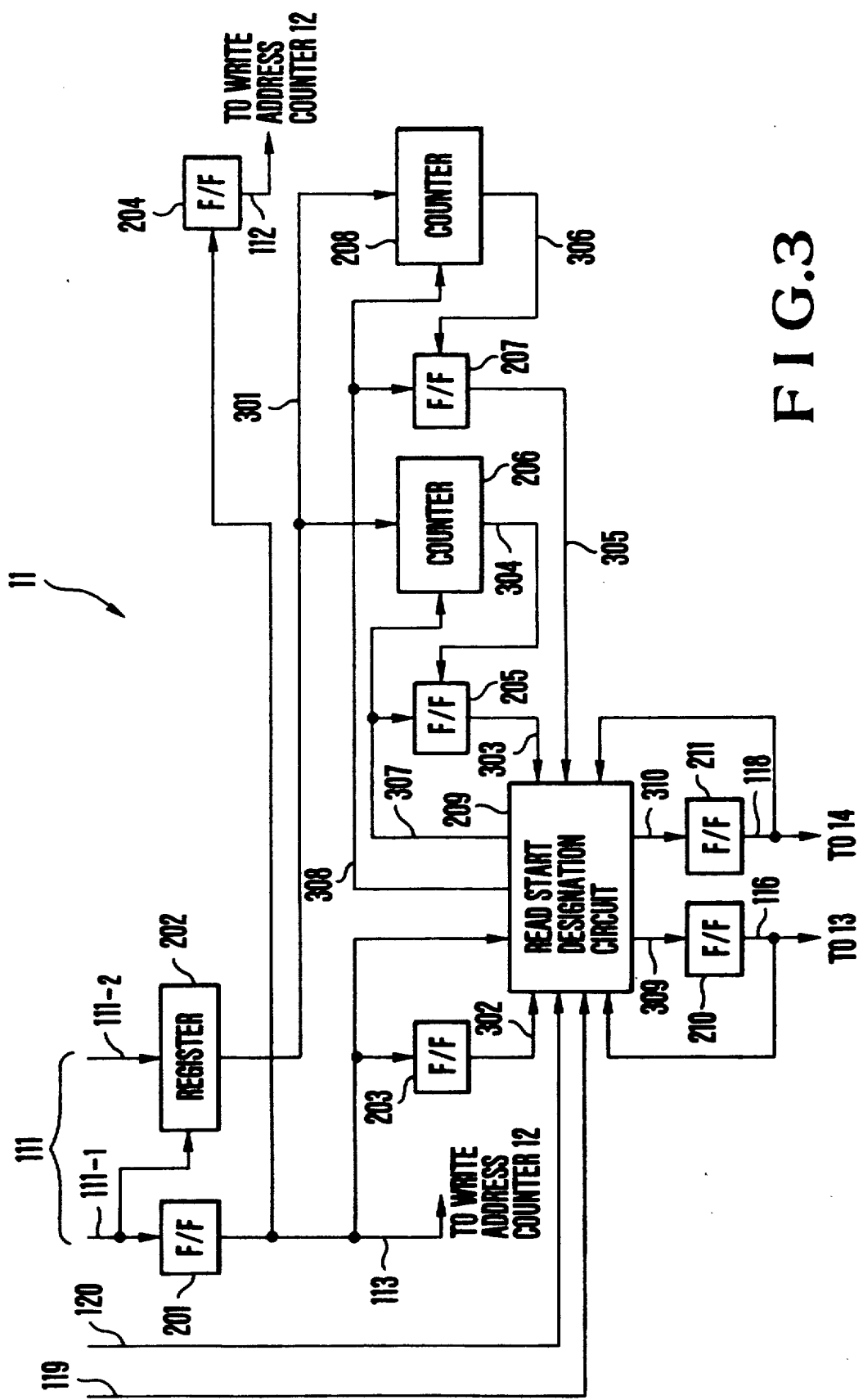
FIG. 3 is a block diagram showing a detailed arrangement of a buffer control circuit 11 shown in FIG. 1.

The buffer control circuit 11 is a circuit for controlling read/write access of the data buffer 3, and its detailed block diagram is shown in FIG. 3.

Referring to FIG. 3, when a write designation signal constituting request information is supplied to the buffer control circuit 11 through a line 111-1 and a write element count constituting the request information is supplied to the buffer control circuit 11 through a line 111-2, a flip-flop 201 and a register 202 are set. Upon setting of the flip-flop 201, a value of a flip-flop 204 which holds a block address for the data buffer 3 is inverted. Blocks different in units of write cycles of the data buffer are assigned. The block address held by the flip-flop 204 is set in the write address counter 12 by the flip-flop 201. In addition, the content of the flip-flop 201 is supplied to a read start designation circuit 209 through a line 113. This content is delayed by a flip-flop 203 by one clock cycle, and the delayed data is supplied to the read start designation circuit 209 through a line 302.

FIG. 4 shows the logic of the read start designation circuit 209.

Flip-flops 205 and 207 are flags representing that the data buffer 3 is being accessed by the read address counters 13 and 14. The flip-flops 205 and 207 are set by read start designation signals 307 and 308 and are reset upon detection of the zero values of read remaining element counters 206 and 208.

The element count held in the register 202 by the read start designation signals 307 and 308 is set in the read remaining element counters 206 and 208 as an initial value as in the flip-flops 205 and 207. The count of each of the counters 206 and 208 is decremented by one every clock cycle.

The LSBs of the read address counters 13 and 14 are supplied to the read start designation circuit 209 through lines 119 and 120 to adjust a read start timing.

The read start designation signal is delayed by flip-flops 210 and 211 by one clock cycle. The delayed signals are output through lines 116 and 118 to set initial values of the read address counters 13 and 14, respectively.

In this embodiment, only 16-byte data is written in the data buffer 3 every clock cycle. This write access does not limit the scope of the present invention. If a technique disclosed in Japanese Patent Laid-Open No. 59-205645 is used, it is apparent to those skilled in the art that read start designation can be performed regardless of write access of the data buffer 3.

Figure 5:
FIG. 5 is a timing chart showing an operation of the data transfer controller.
Figure 5:
Figure 5:
Figure 5:
Figure 5:
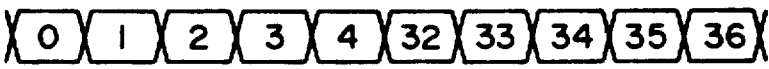
Figure 5:
Figure 5:
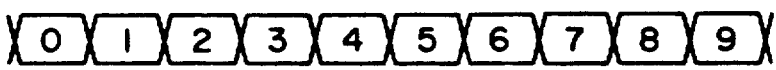
Figure 5:
Figure 5:
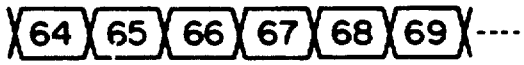
Figure 5:
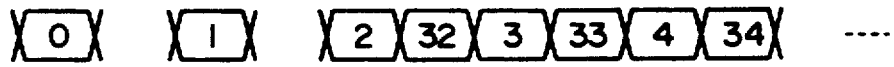
Figure 5:
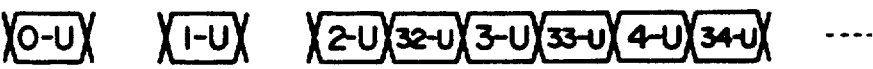
Figure 5:
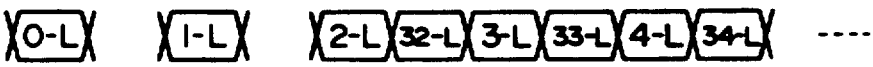
Figure 5:
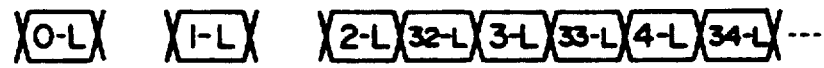
Figure 5:
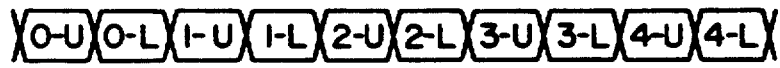
Figure 5:
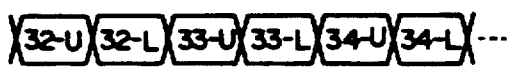
Figure 5:
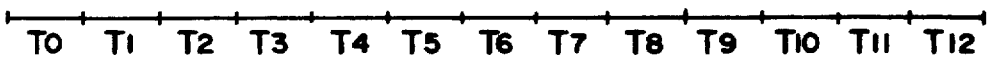

With the above arrangement, an operation of this embodiment will be described with reference to a timing chart of FIG. 5.

When a write designation signal and a write element count are sent through the line 111 one clock cycle prior to time T0, the flip-flop 201 is set, and the write element count is set in the register 202. In this embodiment, the number of elements is set to be 10.

When the flip-flop 201 is set, the line 113 is set at logic "1" at time T0. A block address of logic "0" and an intrablock address of logic "0" supplied through a line 112 are set in the write address counter 12. That is, the count of the write address counter has been set to "0" at time T1. Write access of eight elements is performed from time T1 for 16 bytes every clock cycle, i.e., every two elements for five consecutive clock cycles.

If read access of the data buffer 3 is not performed by the read address counters 13 and 14 at time T0, the flip-flops 205 and 207 are both set at logic "0". A line 309 is set at logic "1" by the logic shown in FIG. 4. In this case, the flip-flop 210 is set. The block address of logic "0" stored in the read address counter 12 at time T1 is set in the read address counter 13 at time T1. At the same time, the intrablock address is cleared to "0".

The read address counter 13 is set to "0" at time T2 and is then incremented every clock cycle. When the content of the read address counter 13 represents an even number, the address signal is supplied to the data buffer 3. More specifically, 6-bit data except for the LSBs are supplied to the data buffer 3 at times T2, T4, T6, T8, and T10 to read out data stored at addresses 0, 1, 2, 3, and 4 of the data buffer 3, respectively.

The LSB of the read address counter 13 is supplied to the switching circuit 5. When the content of the address counter 13 represents an even number, i.e., when the LSB of the address counter 13 is set at logic "0", the upper eight bytes supplied through the line 103 are selected. When content of the address counter 13 represents an odd number, i.e., when the LSB is set at logic "1", the lower eight bytes delayed by one clock cycle and supplied through the line 105 are selected. 8-byte data are transferred to the vector register group 7 from time T2 every clock cycle for 10 consecutive clock cycles. That is, 10 elements are continuously transferred to the vector register group 7.

In fact, timings at which the content of the read address counter 13 represents an even number are times T2, T4, T6, T8, and T10. The upper 8-byte data of the 16-byte data read out from the data buffer 3 at each of these timings is selected by the switching circuit 5. The lower 8-byte data is set in the register 4. In the next clock cycle, i.e., at each of times T3, T5, T7, T9, and T11, the lower 8-byte data of the 16-byte data read out from the data buffer 3 at a corresponding one of times T2, T4, T6, T8, and T10 is selected by the switching circuit 5. As a result, 8-byte data, i.e., each element is supplied from the data buffer 3 to the vector register group 7 through the line 106 every clock cycle.

The write access of the data buffer 3 is completed within five cycles. Write access of the next data is started five or more clock cycles after the write access of the preceding data. For example, when write designation of the next data is detected through the line 111 five clock cycles after write access of the preceding data, an initial address setup designation signal is output to the write address counter 12 through the line 113 at time T5 with a delay of one clock cycle by the flip-flop 201.

The value of the flip-flop 204 is inverted to logic "1" at time T0. At time T5, this value is supplied as a block address to the write address counter 12 through the line 112. The write intrablock address is cleared to "0" through the line 112. Therefore, the 6-bit write address counter 12 is set to be "32" at time T6 and is then incremented every clock cycle, thereby supplying the write address to the data buffer 3.

At time T5 the read address counter 13 is kept operated and the flip-flop 205 is set at logic "1". However, since the read address counter 14 is not used, the flip-flop 207 is kept at logic "0". The value of the read address counter 13 is "3", and the LSB of logic "1" is supplied to the read start designation circuit 209. The read start designation signal is output in accordance with the logic of FIG. 4. The read start designation signal is delayed by the flip-flop 211 by one clock cycle, and initial address set designation is performed through the line 118.

Since the block address of the write address counter 12 is set at logic "1" at time T6, the block address of logic "1" and the intrablock address of logic "0", i.e., "64" are set in the read address counter 14. Subsequently, the read address counter 14 is incremented every clock cycle in the same manner as in read access of the preceding data. When the content of the read address counter 13 represents an odd number, i.e., at times T7, T9, T11, . . . , the address signal is supplied from the read address counter 14 to the data buffer 3 to access the data buffer 3. The 16-byte data is read out from the data buffer 3 at every one of these timings. Since the value of the read address counter 14 is always an even number such as 64, 66, 68, . . . , at these timings, the upper 8-byte data of the data read out from the data buffer 3 is selected by the switching circuit 6. The lower 8-byte data of the data read out at each of times T7, T9, T11, . . . is selected at the next timings, i.e., each of times T8, T10, T12, . . . The selected data is supplied to the vector register group 7 through the line 107.

Two data are simultaneously supplied to the vector register group 7 through the lines 106 and 107 at each of times T7 to T11. Although not described in the operation of this embodiment, if write designation is detected at, e.g., time T9, it is readily understood to those skilled in the art that the data are supplied from the data buffer 3 to the vector register group 7 through the lines 106 and 107 from time T12.

According to the present invention as has been described above, the data buffer (storing means) and a path for simultaneously transferring a plurality of vector data from the data buffer to the vector register group are arranged between the main memory (first device) and the vector register group (second device). The vector data can be supplied to the vector registers at high speed with simple control. In addition, transfer of the second vector data can be started without waiting for the end of transfer of the first vector data. Therefore, the start of vector calculations can be performed earlier.

What is claimed is:

1. A data transfer controller for controlling transfer of vector data from a first device to a second device, the vector data consisting of a plurality of elements, comprising:

storing means, located between said first and second devices, for sequentially storing the vector data supplied from said first device;

n read control means for controlling to sequentially transfer the vector data from said first device to said storing means and each for controlling to read out n elements of one vector data from said storing means to said second device;

n/2 switching circuits, each receiving data from one of n/2 unique pairs of read control means and each alternately supplying said storing means with data from a first read control means of a pair and data from a second read control means of said pair in accordance with a predetermined switching condition;

n data transfer paths respectively corresponding to said n read control means and arranged between said storing means and said second device;

n/2 means for delaying alternate elements, included in half of said data transfer paths, each receiving an undelayed element from said storage means and outputting a delayed element; and n switching circuits in said n data transfer paths, each receiving a delayed element from said n/2 delaying means and an undelayed element from said storing means, selecting elements from said vector data, and supplying said selected elements to said second device.

2. A data transfer controller as recited in claim 1, wherein said vector data is comprised of a plurality of words, wherein each word is comprised of two elements and said delay means delaying one of said two elements.

3. A data transfer controller as recited in claim 1, wherein said delayed element is delayed by a clock cycle.

* * * * *